United States Patent
Watanabe

[11] Patent Number: 5,934,258
[45] Date of Patent: Aug. 10, 1999

[54] FUEL INJECTOR CONTROL SYSTEM FOR CYLINDER INJECTION TYPE INTERNAL COMBUSTION ENGINE

[75] Inventor: Tetsushi Watanabe, Tokyo, Japan

[73] Assignee: Mitsubishi Denki Kabushiki Kaisha, Tokyo, Japan

[21] Appl. No.: 08/990,776

[22] Filed: Dec. 15, 1997

[30] Foreign Application Priority Data

Apr. 18, 1997 [JP] Japan ................................. 9-101950

[51] Int. Cl.$^6$ .......................... H01H 47/04; F02M 51/00
[52] U.S. Cl. ........................................... 123/490; 361/154
[58] Field of Search ............................ 361/154; 123/490, 123/299

[56] References Cited

U.S. PATENT DOCUMENTS

| | | | |
|---|---|---|---|
| Re. 31,391 | 9/1983 | Davis et al. | 123/490 |
| 3,824,969 | 7/1974 | Edison | 123/490 |
| 4,338,651 | 7/1982 | Henrich | 123/490 |
| 4,360,855 | 11/1982 | Ohba | 123/490 |
| 4,479,161 | 10/1984 | Henrich et al. | 123/490 |
| 5,381,297 | 1/1995 | Weber | 361/154 |
| 5,430,601 | 7/1995 | Burcham | 361/154 |
| 5,532,526 | 7/1996 | Ricco et al. | 123/490 |

FOREIGN PATENT DOCUMENTS 63-34387  2/1988  Japan .

Primary Examiner—Erick R. Solis
Attorney, Agent, or Firm—Sughrue, Mion, Zinn, Macpeak & Seas, PLLC

[57] ABSTRACT

A fuel injector control system for a cylinder injection type internal combustion engine capable of suppressing a concentrative heat generation at a voltage generating circuit, which system includes a sensor means (1) for detecting operation state of the internal combustion engine to thereby output engine operation state information (D), a control parameter arithmetic means (2) for determining arithmetically a fuel supply quantity and a fuel injection timing for the engine on the basis of the engine operation state information (D), a plurality of cylinder injection type fuel injectors (61 to 66) for injecting fuel directly and individually to cylinders (#1 to #6) of the engine, a driving circuit (5) for driving electrically the fuel injectors (61 to 66) in response to control signals (C1, . . . , C6) outputted from the control parameter arithmetic means (2), and a voltage generating circuit (4) for supplying fuel injection signals (J1, . . . , J6) to the fuel injectors (61, . . . , 66) through the medium of the driving circuit (5), wherein the voltage generating circuit (4) includes a high-voltage generating means (4H1, 4H2) for supplying overexcitation signals (E1, . . . , E6) in an initial phase of the fuel injection signal (J1, . . . , J6), and a low-voltage generating means (4L1, 4L2) for holding the fuel injection signal (J1, . . . , J6) to be constant at a predetermined current level. The high-voltage generating means (4H1, 4H2) and the low-voltage generating means (4L1, 4L2) are provided in parallel in a number corresponding to that of groups (#1, #3, #5; #2, #4, #6) of the cylinders (#1, . . . , #6) to be controlled groupwise.

8 Claims, 4 Drawing Sheets

FUEL INJECTOR CONTROL SYSTEM FOR CYLINDER INJECTION TYPE INTERNAL COMBUSTION ENGINE

BACKGROUND OF THE INVENTION

1. Field of the Invention

The present invention relates to a fuel injector control system for an internal combustion engine of a cylinder injection type in which fuel is directly injected into cylinders of the engine. More specifically, the invention is concerned with a fuel injector control system capable of preventing or suppressing effectively generation of heat due to concentration of an electric current which may occur upon activation of high-speed fuel injection to the cylinders in a multi-cylinder internal combustion engine or upon divisional fuel injection over a plurality of strokes in an ordinary type internal combustion engine.

2. Description of Related Art

For having better understanding of the invention, background techniques thereof will first be reviewed. As the fuel injector control system for a cylinder injection type internal combustion engine in which there are employed a high-voltage generating means for overexcitation of the electromagnetic coil of the fuel injector at the beginning of the fuel injection and a low-voltage generating means for maintaining the injector in the open state, a fuel injector control system for a gasoline engine and a diesel engine have been well known in the art.

A typical one of such fuel injector control systems as type mentioned above is disclosed, for example, in Japanese Patent Publication No. 26701/1995. As is shown in FIG. 7 of this patent publication, there is generally adopted such arrangement in which a single high-voltage generating means is provided in common to all the fuel injectors to be controlled for realizing overexcitation thereof at the beginning of the fuel injection.

Additionally, a constant current source fed directly from an onboard battery of a motor vehicle is employed as a low-voltage generating means for supplying a constant current of low level to the fuel injector in order to hold the injector in the opened state in succession to the overexcitation thereof.

In this conjunction, it is noted that in the case of a multi-point injection type multi-cylinder engine including as many as six or eight cylinders and equipped with a corresponding number of fuel injectors separately for the individual cylinders, respectively, the time interval between the successive current supplies for the electric energization of the individual fuel injectors during a rotation of the engine is remarkably short when compared with the ordinary engine such as four-cylinder engine. Thus, the single high-voltage generating means provided in common to all the fuel injectors as mentioned above has to be so designed as being capable of accommodating a high current demand. To this end, the high-voltage generating means must be imparted with a large capacity or capability for the power supply, which is however difficult to implement practically. Besides, intensive current flow (i.e., concentration of the electric current) will occur the voltage generating circuit (including the high-voltage-generating means and the low-voltage generating means) upon every actuation thereof. In other words, an excessively large current may flow through the voltage generating circuit, which will result in generation of a large amount of heat. To say in another way, heat loss will increase to a great disadvantage from the viewpoint of economic or effective utilization of the electric energy.

Such concentration of the current and the intensive heat generation may be brought about or promoted equally by the low-voltage generating means as well.

In some ordinary type internal combustion engine having four or less cylinders, such a fuel injection system is adopted in which the fuel injection to each of the cylinders is performed a number of times over a plurality of strokes in order to ensure an adequate amount of fuel injection particularly during a high-speed operation of the engine. Such fuel injection for each cylinder over a plurality of strokes thereof is known as the divisional or distributive fuel injection.

More specifically, in the divisional or distributive fuel injection control system for the cylinder injection type internal combustion engine, the fuel injection is effected divisionally or distributively in both the suction stroke and the compression stroke in contrast to the conventional direct fuel injection system in which the fuel injection is validated only in the compression stroke. As a result of this, the fuel injection is performed simultaneously for both the cylinder which is in the compression stroke and the cylinder which is in the suction stroke (i.e., the cylinder for which the compression stroke is to follow) in the engine equipped with the divisional fuel injection system. Consequently, a heavy load will be imposed on the power supply circuit. For this reason, the divisional direct fuel injection system suffers a limitation in the response capability or performance for generation of a predetermined voltage required for effectuating the simultaneous divisional fuel injections for the two cylinders although such limitation depend on the capability or capacity of the high-voltage generating means and the low-voltage generating means.

At the beginning (or in the initial phase) of the electric energization of the fuel injector for actuation thereof, it is required to supply a large current to the electromagnetic coil of the fuel injector by applying a high voltage in order to ensure opening of the valve of the fuel injector with high reliability. In this conjunction, it is noted that when the high-voltage generating means is driven continuously throughout the overexcitation period, an increased amount of electric energy will be consumed ineffectively (i.e., useless power consumption will increase). Besides, electromagnetic noise is likely to be generated by a boost-up circuit employed for generating a high voltage, which noise will exert adverse influence to a control unit and peripheral devices installed on the engine and the motor vehicle.

As is apparent from the foregoing description, the conventional fuel injector control system for the cylinder injection type internal combustion engine known heretofore in which the voltage generating circuit (including the high-voltage generating means and the low-voltage generating means) for driving the individual fuel injectors designed for injecting the fuel directly into the associated cylinders, respectively, is realized as a single circuit suffers such problems difficult to solve in practical applications that the capability of the high-voltage generating means and the low-voltage generating means is insufficient for driving the injectors with high reliability and that the concentrative heat generation takes place in the voltage generating circuit particularly in the case of the multi-cylinder internal combustion engine in which the time interval between the electric energizations of the fuel injectors is short or in the ordinary type internal combustion engine in which the divisional fuel injection is adopted.

Another problem of the conventional fuel injector control system can be seen in that a large amount of electric energy tends to be consumed uselessly and that electromagnetic or radio noise is generated during the overexcitation period at the beginning of the electrical energization of the coil of the fuel injector.

SUMMARY OF THE INVENTION

In the light of the state of the art described above, it is an object of the present invention to provide a fuel injector control system for the cylinder injection type internal combustion engine in which the period or duration of current supply to the fuel injector is shortened in view of the limitation in the capability of the voltage generating circuit for generating a voltage of a sufficiently high level for driving the fuel injectors without fail.

Another object of the present invention is to provide a fuel injector control system for the cylinder injection type internal combustion engine in which concentrative heat generation in the voltage generating circuit is suppressed to thereby allow a divisional or groupwise fuel injection control to be easily adopted in the multi-cylinder internal combustion engine as well as in the ordinary internal combustion engine.

Yet another object of the present invention is to provide a fuel injector control system in which useless power consumption and noise generation during the overexcitation period at the beginning of the current supply to the fuel injector can be effectively suppressed when applied to the fuel injection system for the cylinder injection type multi-cylinder gasoline engine or for the diesel engine.

In view of the above and other objects which will become apparent as the description proceeds, there is provided according to a first aspect of the present invention a fuel injector control system for a cylinder injection type internal combustion engine, which system includes a sensor means for detecting operation state of the internal combustion engine to thereby output engine operation state information, a control parameter arithmetic means for determining arithmetically a fuel supply quantity and a fuel injection timing for the engine on the basis of the engine operation state information, a plurality of cylinder injection type fuel injectors for injecting fuel directly and individually to cylinders of the engine, a driving circuit for driving electrically the fuel injectors in response to control signals outputted from the control parameter arithmetic means, and a voltage generating circuit for supplying fuel injection signals to the fuel injectors through the medium of the driving circuit. The voltage generating circuit is constituted by a high-voltage generating means for supplying overexcitation signals in an initial phase of the fuel injection signal, and a low-voltage generating means for holding the fuel injection signal to be constant at a predetermined current level. The high-voltage generating means and the low-voltage generating means are provided in parallel in a number corresponding to that of groups of the cylinders to be controlled groupwise.

With the arrangement of the fuel injector control system for the cylinder injection type internal combustion engine according to the invention in which a plurality of current supply sources (each including a high-voltage generating means and a low-voltage generating means) are provided in association with groups of the fuel injectors to be controlled, the fuel injector control system can be advantageously and profitably employed in the multi-cylinder internal combustion engines such as the six-cylinder or eight-cylinder engine in which the electric energization interval for the fuel injectors is short without suffering problem such as concentrative heat generation in the voltage generating circuit. Additionally, the fuel injector control system according to the invention can be applied advantageously to the cylinder injection type gasoline engine having four or less cylinders or the diesel engine in which the divisional fuel injection is adopted.

Furthermore, because the period during which the fuel injector is electrically energized is shortened for coping with the limitation in the capability of the voltage generating circuit as well as the concentrative heat generation in the voltage generating circuit mentioned previously, there can be realized a fuel injector control system capable of being easily adopted not only in the multi-cylinder engine in which the periodical fuel injection interval is short and in which the high-voltage generating means and the low-voltage generating means are indispensable but also in the engine in which the divisional fuel injector control is performed or in the diesel engine.

In a preferred mode for carrying out the invention, the groups of the cylinders energized groupwise by the high-voltage generating means and the low-voltage generating means may be constituted by the cylinders for which the fuel injection sequence is distanced by two strokes.

By virtue of the arrangement of the fuel injector control system that a plurality of the power supplies are provided separately and individually for the electric energization of the injector groups, each composed of a plurality of fuel injectors for which the fuel injection sequence is distanced by two strokes and for which the injector coil energization starting timings are distanced at least by a predetermined time (which depends on the response capability or performance of the high-voltage generating means and the low-voltage generating means), the voltage generating capability of the high-voltage generating means and the low-voltage generating means can be lowered to a possible minimum.

In another preferred mode for carrying out the invention, the driving circuit may include a plurality of inhibiting means for inhibiting individually high-voltage outputs of the high-voltage generating means during output periods of the overexcitation signals, respectively, wherein the inhibiting means is so designed as to inhibit generation of the high voltage by the high-voltage generating means in response to the overexcitation signals for the cylinder groups to be controlled.

With the arrangement described above, the fuel injector control system according to the present invention can be applied advantageously and profitably to the multi-cylinder engine as well as the diesel engine while avoiding useless power consumption in the overexcitation period at the beginning of the electric energization of the fuel injector and ensuring suppression of radio noise generation with high reliability.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

Embodiment 1

Figure 1:
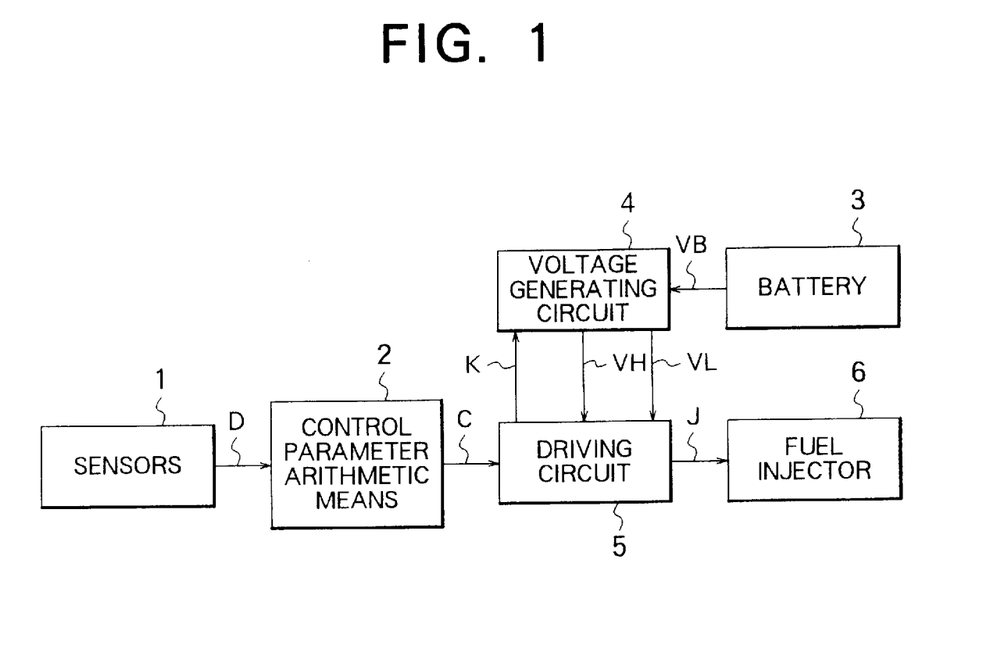
FIG. 1 is a block diagram showing generally a system configuration of a fuel injector control system for a cylinder injection type internal combustion engine according to an embodiment of the present invention.

FIG. 1 is a block diagram showing generally a system configuration of a fuel injector control system for a cylinder injection type internal combustion engine according to a first embodiment of the present invention.

Referring to FIG. 1, the cylinder injection type internal combustion engine is provided with a variety of sensors 1 for detecting the operation states of the engine to thereby output operation state information D. As the operation state information, there may be mentioned information concerning the depression stroke of an acceleration pedal of a motor vehicle equipped with an cylinder injection type internal combustion engine, opening degree of a throttle valve, temperature of engine cooling water, intake air flow rate and others. These sensors are known in the art.

The system includes a control parameter arithmetic means 2 which may be constituted by a microcomputer or the like for performing arithmetic operations to determine on the basis of the operation state information D available from the above-mentioned various sensors 1 a plurality of control parameters for the internal combustion engine such as fuel supply quantity and fuel injection timing to thereby output a control signal C for driving or opening fuel injection valves (which are herein referred to as the fuel injectors).

A battery 3 mounted on the motor vehicle supplies a battery voltage VB. For the purpose of generating a high voltage VH and a low voltage VL on the basis of the battery voltage VB, a voltage generating circuit 4 is provided. Parenthetically, the high voltage VH1 is generated by boosting up the battery voltage VB while the low voltage VL which is maintained at a constant voltage level is generated by lowering or stepping down the battery voltage VB.

A driving circuit 5 generates a fuel injection signal J in response to the control signal C on the basis of the high voltage VH and the low voltage VL and additionally generates an inhibiting signal K for inhibiting the output of the high voltage VH during an overexcitation period (described later on). To this end, the inhibiting signal K outputted from the driving circuit 5 is supplied to the voltage generating circuit 4.

The internal combustion engine is provided with a plurality of cylinder injection type (direct fuel injection type) injectors 6 which are electrically driven individually in response to the fuel injection signal J supplied from the voltage generating circuit 4 by way of the driving circuit 5 for injecting the fuel directly into the individual cylinders of the internal combustion engine.

Needless to say, the fuel injection signal J controls the fuel injectors in accordance with the fuel injection quantity and the fuel injection timing determined by the control parameter arithmetic means 2 on the cylinder-by-cylinder basis.

Figure 2:
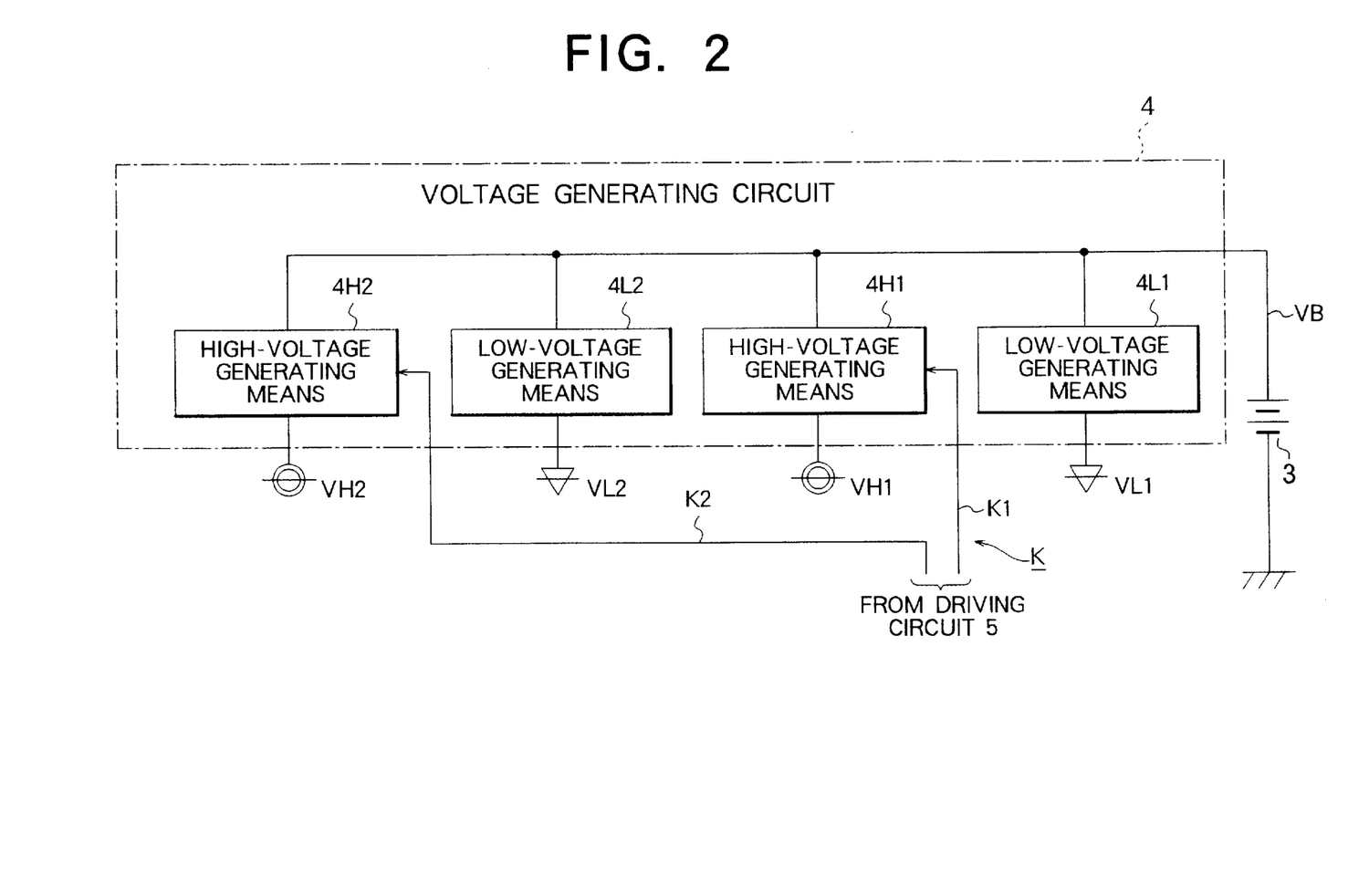
FIG. 2 is a block diagram showing in concrete a structure of a voltage generating circuit shown in FIG. 1.

FIG. 2 is a block diagram showing schematically a configuration of the voltage generating circuit 4.

Referring to FIG. 2, the voltage generating circuit 4 includes a pair of high-voltage generating means 4H1 and 4H2. Each of the high-voltage generating means 4H1 and 4H2 is designed for supplying an overexcitation signal (described later on) at the beginning of a period or duration of the fuel injection signal J. Further, the voltage generating circuit 4 includes a pair of low-voltage generating means 4L1 and 4L2 each designed for holding the exciting current at a low constant current level.

The high-voltage generating means 4H1; 4H2 and the low-voltage generating means 4L1; 4L2 are provided in parallel in a number corresponding to that of the groups of the cylinders to be controlled and connected to the anode of the battery 3, respectively. In the case of the fuel injector control system for the cylinder injection type internal combustion engine now under consideration, it is assumed that the engine cylinders are classified into two groups. Accordingly, the high-voltage generating means 4H1; 4H2 as well as the low-voltage generating means 4L1; 4L2 are provided in pairs, respectively, as mentioned above.

High voltages are generated by the high-voltage generating means 4H1 and 4H2 are represented by VH1 and VH2, respectively, while low voltages are generated by the low-voltage generating means 4L1 and 4L2 are represented by VL1 and VL2, respectively.

On the other hand, inhibiting signals K1 and K2 are generated by the driving circuit 5 for inhibiting individually and independently the high voltage outputs of the high-voltage generating means 4H1 and 4H2, respectively, during a period in which the overexcitation signal is outputted. Hereinafter, this period will also be referred to as the overexcitation period.

Figure 3:
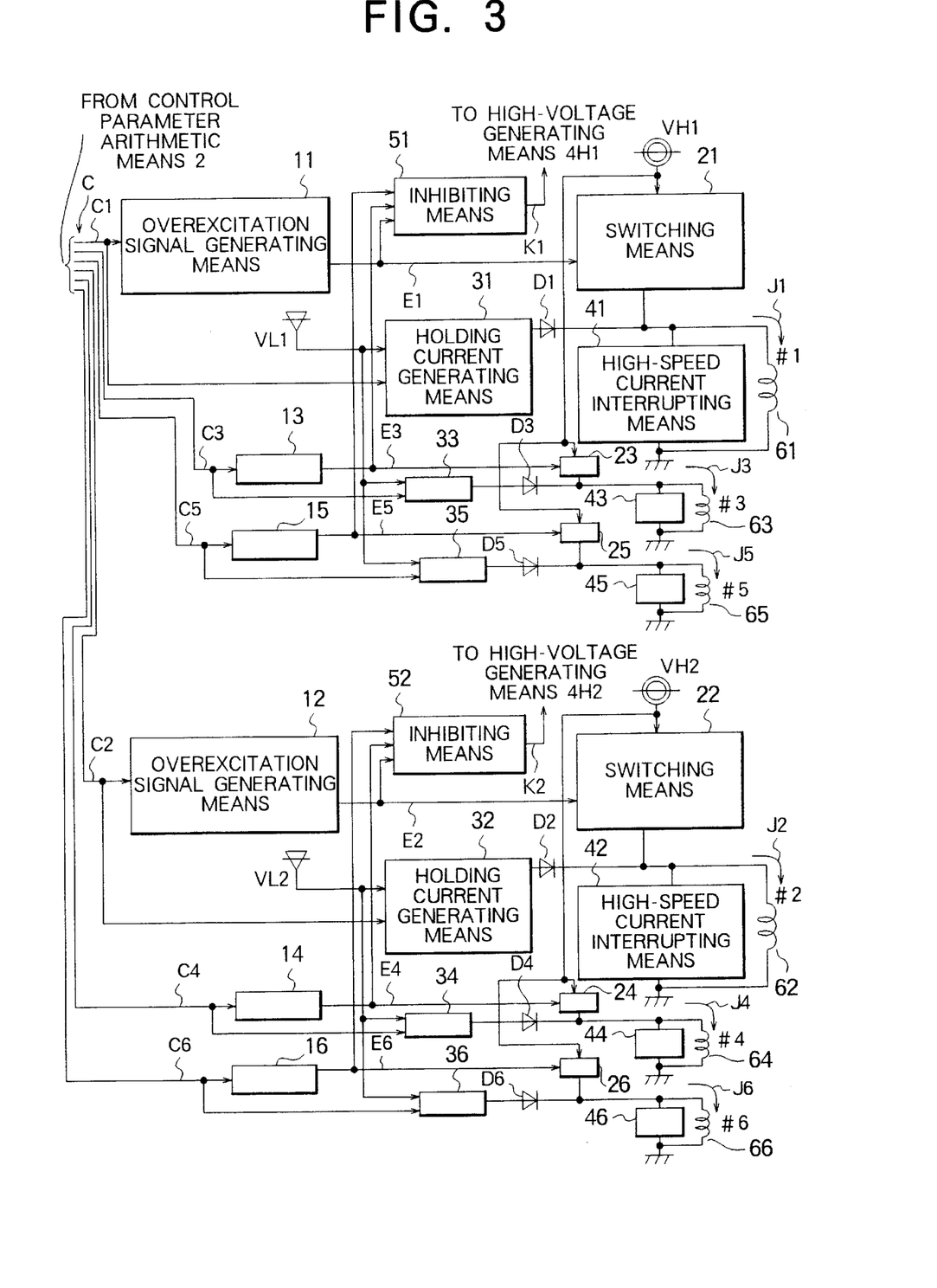
FIG. 3 is a block diagram showing in concrete a structure of a driving circuit shown in FIG. 1.

FIG. 3 is a block diagram showing a configuration of the driving circuit 5 shown in FIG. 1 on the assumption that the internal combustion engine now of concern is a six-cylinder engine which is also called V-type engine.

Referring to FIG. 3, fuel injectors 61, . . . , 66 are provided in association with the engine cylinders #1, . . . , #6, respectively. Each of the fuel injectors is equipped with an exciting coil for driving the injector valve. Accordingly, in FIG. 3, the fuel injectors are shown in the form of the exciting coils, respectively, for the convenience of illustration.

Control signals C1, . . . , C6 are generated for the cylinder #1, . . . , #6 for controlling the fuel injections therefor, respectively, while fuel injection signals or exciting currents J1, . . . , J6 are caused to flow through the exciting coils of the fuel injector 61, . . . , 66, respectively.

Overexcitation signal generating means 11, . . . , 16 are so designed as to generate overexcitation signals E1, . . . , E6 for each of the cylinders #1, . . . , #6 in response to the control signals C1, . . . , C6, respectively.

Switching means 21, . . . , 26 serve for switching on/off the high voltage VH1 or VH2 in response to the overexciting signals E1, . . . , E6, respectively.

More specifically, the high voltage VH1 generated by the high-voltage generating means 4H1 is applied to the fuel injectors 61, 63 and 65 of the cylinders #1, #3 and #5 by way of the switching means 21, 23 and 25, respectively.

On the other hand, the high voltage VH2 outputted from the high-voltage generating means 4H2 is applied to the injectors 62, 64 and 66 of the cylinders #2, #4 and #6 by way of the switching means 22, 24 and 26, respectively.

Holding current generating means 31, . . . , 36 function as switching means for switching on/off the low voltage VL1 or VL2 in response to the control signal C1, . . . , C6 to thereby supply constant holding currents of a low level to the fuel injectors 61, 63, 65; 62, 64, 66 of the individual cylinders #1, . . . , #6 by applying the low voltage VL1 or VL2.

More specifically, the holding current derived from the low voltages VL1 and VL2 generated by the low-voltage generating means 4L1 is supplied to the fuel injectors 61, 63 and 65 of the cylinders #1, #3 and #5 by way of the holding current generating means 31, 33 and 35, respectively.

On the other hand, the holding current derived from the low voltage VL2 generated by the low-voltage generating means 4L2 is supplied to the injectors 62, 64 and 66 of the cylinders #2 #4 and #6 by way of the holding current generating means 32, 34 and 36, respectively.

High-speed current interrupting means 41, . . . , 46 are inserted in parallel with the exciting coils of the fuel injectors 61 to 66 of the cylinders #1 to #6, respectively, for interrupting speedily the exciting currents for the fuel injectors 61 to 66, represented by the fuel injection signals J1 to J6, respectively.

Further, diodes D1 to D6 are inserted between the holding current generating means 31 to 36 and the fuel injectors 61 to 66, respectively, for allowing the holding currents to flow to the fuel injectors 61 to 66, respectively, while preventing the currents due to the high voltages VH1 and VH2 from flowing reversely to the holding current generating means 31 to 36 via the switching means 21 to 26, respectively.

Inhibiting means 51; 52 generate the inhibiting signals K1; K2, respectively, for inhibiting individually operation of the high-voltage generating means 4H1; 4H2 during the overexcitation period (i.e., output periods of the overexciting signals E1, . . . , E6), respectively.

More specifically, the inhibiting means 51 provided in association with the cylinders #1, #3 and #5 generates the inhibiting signal K1 for the high-voltage generating means 4H1 in response to either the overexciting signal E1, E3 or E5.

On the other hand, the inhibiting means 52 associated with the cylinders #2, #4 and #6 generates the inhibiting signal K2 for the high-voltage generating means 4H2 in response to either the overexciting signal E2, E4 or E6.

The high-voltage generating means 4H1 and the low-voltage generating means 4L1 are provided in association with the cylinder group including the cylinders #1, #3 and #5, while the high-voltage generating means 4H2 and the low-voltage generating means 4L2 are provided with another cylinder group including the cylinders #2, #4 and #6.

Figure 4:
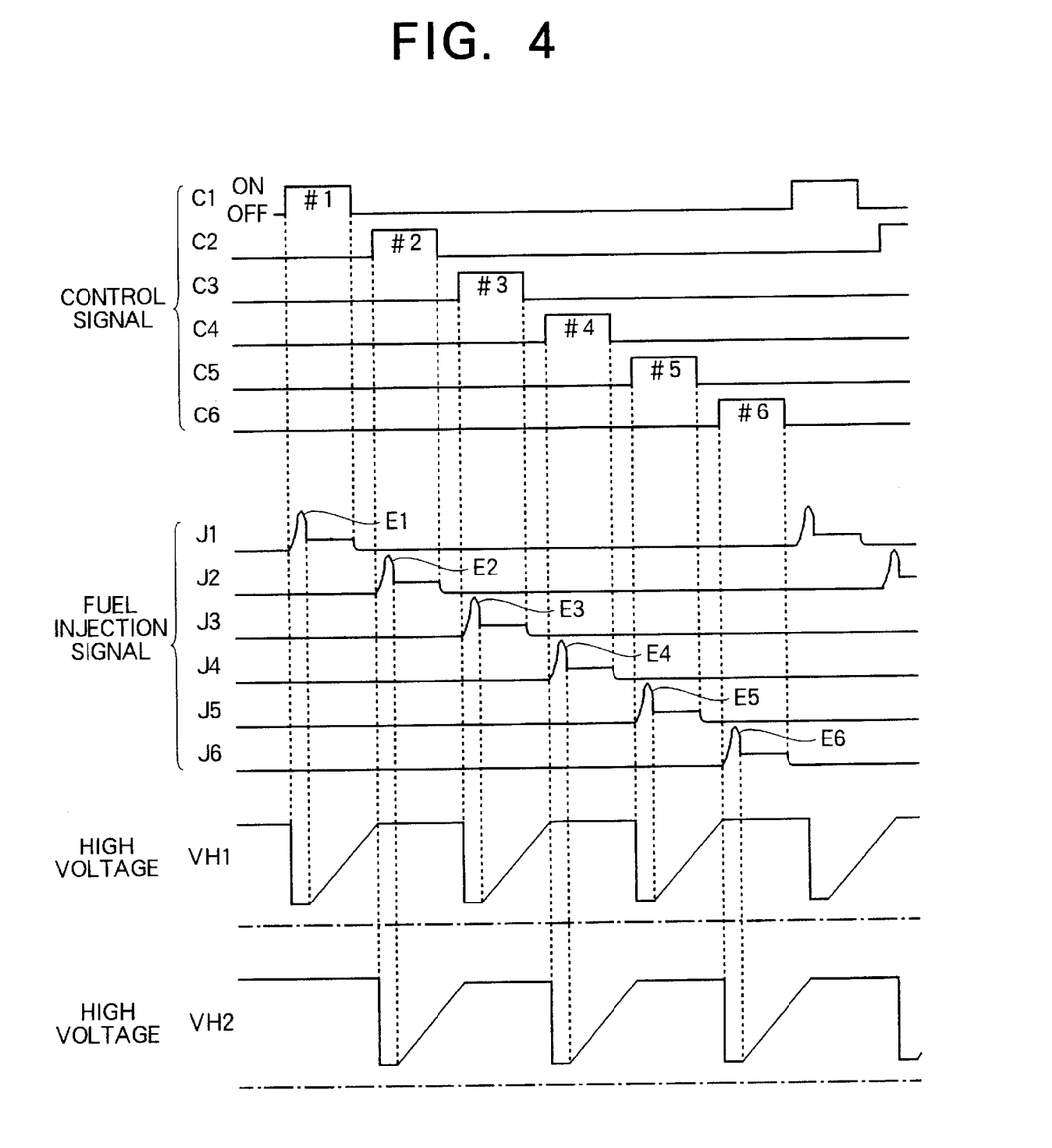
FIG. 4 is a timing chart showing various signal waveforms for illustrating operation of the fuel injector control system.

FIG. 4 is a timing chart for illustrating operation of the fuel injector control system for the cylinder injection type internal combustion engine according to the instant embodiment of the invention and shows changes in the control signals C1 to C6, the fuel injection signals J1 to J6 and the high voltages VH1 and VH2 as a function of time lapse.

In the case of the cylinder injection type internal combustion engine, the fuel injection control for the individual cylinders #1 to #6 is performed in the compression stroke of the four strokes, i.e., the intake stroke, the compression stroke, the explosion stroke and then the exhaust stroke.

Further, in the case of the V-type six-cylinder engine, the electric current supply to the fuel injectors 61, . . . , 66 is controlled generally in the sequence of the cylinders #1, #2, #3, #4, #5 and #6. In other words, the fuel injection signals J1, . . . , J6 are generated in the sequence mentioned above.

Accordingly, each of the cylinder groups mentioned previously is composed of the cylinders whose strokes are distanced by two strokes in the four-cycle engine. More specifically, the cylinders for which the fuel injection is controlled in every other stroke or whose compression strokes are distanced by two strokes constitute sets of cylinders to be controlled groupwise.

In the following, the set of the cylinder #1, #3 and #5 to be controlled as a group or groupwise will be referred to as a first group, while the set of the cylinders #2, #4 and #6 to be controlled groupwise will be called a second group.

Next, description will be directed to operation of the fuel injector control system for the cylinder injection type internal combustion engine according to the instant embodiment of the invention shown in FIGS. 1 to 3 by reference to FIG. 4.

At first, the high-voltage generating means 4H1 and 4H2 incorporated in the voltage generating circuit 4 boost up the battery voltage VB to thereby generate the high voltages VH1 and VH2 higher than the battery voltage VB.

On the other hand, the low-voltage generating means 4L1 and 4L2 incorporated in the voltage generating circuit 4 serve to lower or step down the battery voltage VB for thereby generating the constant low voltages VL1 and VL2 which are lower than the battery voltage VB.

The overexcitation signal generating means 11, . . . , 16 generate the overexcitation signals E1, . . . , E6 for the fuel injectors 61 to 66 of the individual cylinders #1, . . . , #6 in response to the control signals C1, . . . , C6, respectively, which are supplied from the control parameter arithmetic means 2 at the beginning of the fuel injection signals J1, . . . , J6, respectively (refer to FIG. 4).

The inhibiting means 51 generates the inhibiting signal K1 during the overexcitation period of the first group (i.e., the output periods of the overexcitation signals E1, E3 and E5, respectively) to thereby disable temporarily the boost-up function of the high-voltage generating means 4H1.

Similarly, the inhibiting means 52 generates the inhibiting signal K2 during the overexcitation period of the second group (i.e., the output periods of the overexcitation signals E2, E4 and E6, respectively) to thereby disable temporarily the boost-up function of the high-voltage generating means 4H2.

In this way, the high voltage VH1 for the first group is turned off in response to the overexcitation signals E1, E3 and E5 with the high voltage VH2 for the second group being turned off in response to the overexcitation signals E2, E4 and E6, as can be seen in FIG. 4.

The switching means 21, 23 and 25 are switched on (closed) in response to the overexcitation signals E1, E3 and E5, respectively, to supply the high voltage VH1 to the fuel injectors 61, 63 and 65 of the first group, respectively.

On the other hand, the switching means 22, 24 and 26 are closed in response to the overexcitation signals E2, E4 and E6, respectively, to supply the high voltage VH2 to the fuel injectors 62, 64 and 66 of the second group, respectively.

The holding current generating means 31, 33 and 35 are switched on (closed) in response to the control signals C1, C3 and C5 to supply the constant low voltage VL1 to the fuel injectors 61, 63 and 66 of the first group for thereby maintaining the fuel injectors 61, 63 and 65 in the valve-opened state.

Similarly, the holding current generating means 32, 34 and 36 are turned on or actuated in response to the control signals C2, C4 and C6 to supply the constant low voltage VL2 to the fuel injectors 62, 64 and 66 of the second group to thereby maintain the fuel injectors 61, 63 and 66 in the valve-opened state.

During the holding current supplying period succeeding to the end of the overexcitation period, the high-voltage generating means 4H1 and 4H2 resume the voltage boost-up operation to generate again the high voltages VH1 and VH2.

With the high-speed current interrupting means 41 to 46, the interruption of the current can be realized with high speed upon deenergization of the fuel injector 61, . . . , 66 (i.e., when the current supply to the fuel injector 61, . . . , 66 is to be interrupted).

Now, the current supply control for the fuel injector 61 of the cylinder #1 belonging to the first group will be described in more concrete.

At first, the overexcitation signal generating means 11 generates the overexcitation signal E1 only for a predetermined time in the initial phase of the fuel injection signal J1 in response to the control signal C1.

As a result, the switching means 21 is turned on, whereby the high voltage VH1 is applied to the fuel injector 61 through the switching means 21. Thus, the fuel injector 61 is opened due to the overexcitation current corresponding to the overexcitation signal E1.

Subsequently, when the on-time duration of the control signal C1 is longer than the predetermined time of the overexcitation signal E1 mentioned previously, the holding current generating means 31 is turned on by the control signal C1, as a result of which the fuel injector 61 is supplied with the constant low voltage VL1 by way of the diode D1.

In this way, energization of the fuel injection signal J1 is sustained at a predetermined current value which allows the fuel injector 61 to be held in the opened state.

Thereafter, when the control signal C1 is cleared with the power supply to the fuel injector 61 being terminated, the holding current generating means 31 is turned off with the fuel injection signal or current J1 being speedily interrupted by the high-speed current interrupting means 41.

The current supply or energization control for the fuel injector 62 of the cylinder #2 belonging to the second group is performed in the similar manner as in the case of the fuel injector 61 for the first group described above except that the high voltage VH2 for the overexcitation and the low voltage VL2 for the holding current are employed in place of the high voltage VH1 and the low voltage VL1, respectively. In that case, the fuel injection signal J2 is generated in response to the control signal C2 through cooperation of the overexcitation signal generating means 12, the switching means 22, the holding current generating means 32, the diode D2 and the high-speed current interrupting means 42.

In succession, the current supply control is carried out similarly in the order of the cylinder #3 belonging to the first group, the cylinder #4 belonging to the second group, and so forth.

In this way, the current supply or energization controls for the fuel injectors 61 to 66 of the cylinders #1 to #6 are performed sequentially.

In the voltage generating circuit 4 provided for supplying the electric currents to the individual fuel injectors 61 to 66, the high-voltage generating means 4H1 for supplying the overexcitation current and the low-voltage generating means 4L1 for supplying the holding current are disposed for the fuel injectors 61, 63 and 65 of the first group.

On the other hand, the high-voltage generating means 4H2 for supplying the overexcitation current and the low-voltage generating means 4L2 for supplying the holding current are disposed for the fuel injectors 62, 64 and 66 of the second group.

To say in another way, the high-voltage generating means and the low-voltage generating means are installed independently for the fuel injectors of the cylinders whose fuel injection timing is distanced by two strokes, as described above. Owing to this arrangement, the high voltages VH1 and VH2 can be made effective alternately.

Thus, even when the time interval intervening between the time points for starting the current supply to the fuel injectors 61 to 66 of the individual cylinders #1, . . . , #6 become short, the current supply to the individual fuel injectors 61, . . . , 66 can be performed without need for enhancing the response capability or performance of the high-voltage generating means 4H1 and 4H2.

As a result of this, in the fuel injector control system for a multi-cylinder injection type internal combustion engine, (e.g. six-cylinder or eight-cylinder engine) or for a diesel engine, substantially no limitation is imposed on the response capability or performance of the high-voltage generating means 4H1 and 4H2 even when the fuel injection starting cycle becomes short.

Even in the four-cylinder engine, a divisional fuel injection may be performed distributively over a plurality of strokes in order to ensure an adequate fuel injection quantity. In that case, the fuel injection control is performed for a plurality of engine cylinders whose strokes are consecutive to one another. In this conjunction, it is to be mentioned that since the cylinders belonging to each of the cylinder groups to be controlled are distanced by two strokes according to the teachings of the invention, the power supply can be effectuated divisionally, whereby the current concentration can be prevented.

Furthermore, because the output of the high voltages VH1 and VH2 are inhibited at an early stage of the current supply to the fuel injectors 61 to 66, useless power consumption during the overexcitation period can be precluded.

It should also be mentioned that the high-voltage generating means 4H1; 4H2 is ordinarily implemented by the DC/DC converter which includes a voltage boost-up reactor. Consequently, when the high-voltage generating means 4H1; 4H2 is actuated during the overexcitation period, there may be produced large electromagnetic noise. However, because the output operation of the high voltage VH1; VH2 is inhibited during the overexcitation period according to the teaching of the invention, such noise generation can positively be suppressed as well, to another advantage.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although the invention has been described in conjunction with the fuel injector control system for the multi-cylinder engine incorporating six or more cylinders, it should be appreciated that the invention can equally be applied to the internal combustion engine in which the divisional fuel injection is adopted even when the number of the engine cylinders is small as in the case of the engine which has four or less cylinders.

Additionally, although the invention has been described on the assumption that it is applied to the fuel injector control system for the cylinder injection type internal combustion engine, it should be appreciated that the invention can equally find application to fuel injector control systems of other types in which the electromagnetic valves constitutes loads for which the current supply is to be controlled.

Accordingly, all suitable modifications and equivalents may be resorted to, falling within the spirit and scope of the invention.

What is claimed is:

1. A fuel injector control system for a cylinder injection type internal combustion engine, comprising:

sensor means for detecting operation state of said internal combustion engine to thereby output engine operation state information;

control parameter arithmetic means for determining arithmetically a fuel supply quantity and a fuel injection timing for said internal combustion engine on the basis of said engine operation state information;

a plurality of cylinder injection type fuel injectors for injecting fuel directly and individually to cylinders of said internal combustion engine;

a driving circuit for driving electrically said fuel injectors in response to control signals outputted from said control parameter arithmetic means; and a voltage generating circuit for supplying fuel injection signals to said fuel injectors through the medium of said driving circuit, wherein said voltage generating circuit includes:
high-voltage generating means for supplying overexcitation signals in an initial phase of said fuel injection signal; and
low-voltage generating means for holding said fuel injection signal to be constant at a predetermined current level, and
wherein said high-voltage generating means and said low-voltage generating means are provided in parallel in a number corresponding to the number of groups of said cylinders to be controlled groupwise.

2. A fuel injector control system according to claim 1, wherein the groups of said cylinders energized groupwise by said high-voltage generating means and said low-voltage generating means are constituted by the cylinders for which the fuel injection sequence is distanced by two strokes.

3. A fuel injector control system according to claim 1, said driving circuit including:

a plurality of inhibiting means for inhibiting individually high-voltage outputs of said high-voltage generating means during output periods of said overexcitation signals, respectively, wherein said inhibiting means inhibits generation of the high voltage by said high-voltage generating means in response to said overexcitation signals for said cylinder groups to be controlled.

4. A fuel injector control system for a cylinder injection type internal combustion engine, comprising:

sensor circuitry operable to detect an operation state of said internal combustion engine and output engine operation state information;

control parameter arithmetic circuitry operably connected to said sensor circuitry to receive said engine operation state information, said arithmetic circuitry operable to determine a fuel supply quantity and a fuel injection timing for said internal combustion engine on the basis of said engine operation state information;

a plurality of cylinder fuel injectors for injecting fuel directly and individually to cylinders of said internal combustion engine;

a driving circuit operable to drive electrically said fuel injectors in response to control signals outputted from said control parameter arithmetic circuitry; and a voltage generating circuit operable to supply fuel injection signals to said fuel injectors through said driving circuit, wherein said voltage generating circuit includes:
high-voltage generating circuitry operable to supply overexcitation signals in an initial phase of said fuel injection signal; and
low-voltage generating circuitry operable to hold said fuel injection signal to be constant at a predetermined current level, and
wherein said high-voltage circuitry and said low-voltage circuitry are provided in parallel.

5. A fuel injector control system according to claim 4, wherein said high-voltage generating circuitry and said low-voltage circuitry are provided in parallel in a number corresponding to the number of groups of said cylinders to be controlled groupwise.

6. A fuel injector control system according to claim 5, wherein the groups of said cylinders energized groupwise by said high-voltage generating circuitry and said low-voltage generating circuitry comprise the cylinders for which the fuel injection sequence is distanced by two strokes.

7. A fuel injector control system according to claim 5, said driving circuit including:

inhibiting circuitry operable to inhibit individually high-voltage outputs of said high-voltage generating circuitry during output periods of said overexcitation signals, respectively, wherein said inhibiting circuitry inhibits generation of the high voltage by said high-voltage generating circuitry in response to said overexcitation signals for said cylinder groups to be controlled.

8. A fuel injector control system according to claim 4, wherein the control system is capable of individually controlling the amount of fuel sent to each fuel injector.

* * * * *